A. CARRILLO.
APPARATUS FOR DISTRIBUTING FERTILIZERS.
APPLICATION FILED FEB. 25, 1915.

1,180,470.

Patented Apr. 25, 1916.
3 SHEETS—SHEET 1.

WITNESSES:
Berthold Oblatt
Otto Gans

INVENTOR.
Antonio Carrillo.
BY
ATTORNEYS.

A. CARRILLO.
APPARATUS FOR DISTRIBUTING FERTILIZERS.
APPLICATION FILED FEB. 25, 1915.

1,180,470.

Patented Apr. 25, 1916.
3 SHEETS—SHEET 2.

WITNESSES:

INVENTOR.
Antonio Carrillo.
BY
ATTORNEYS.

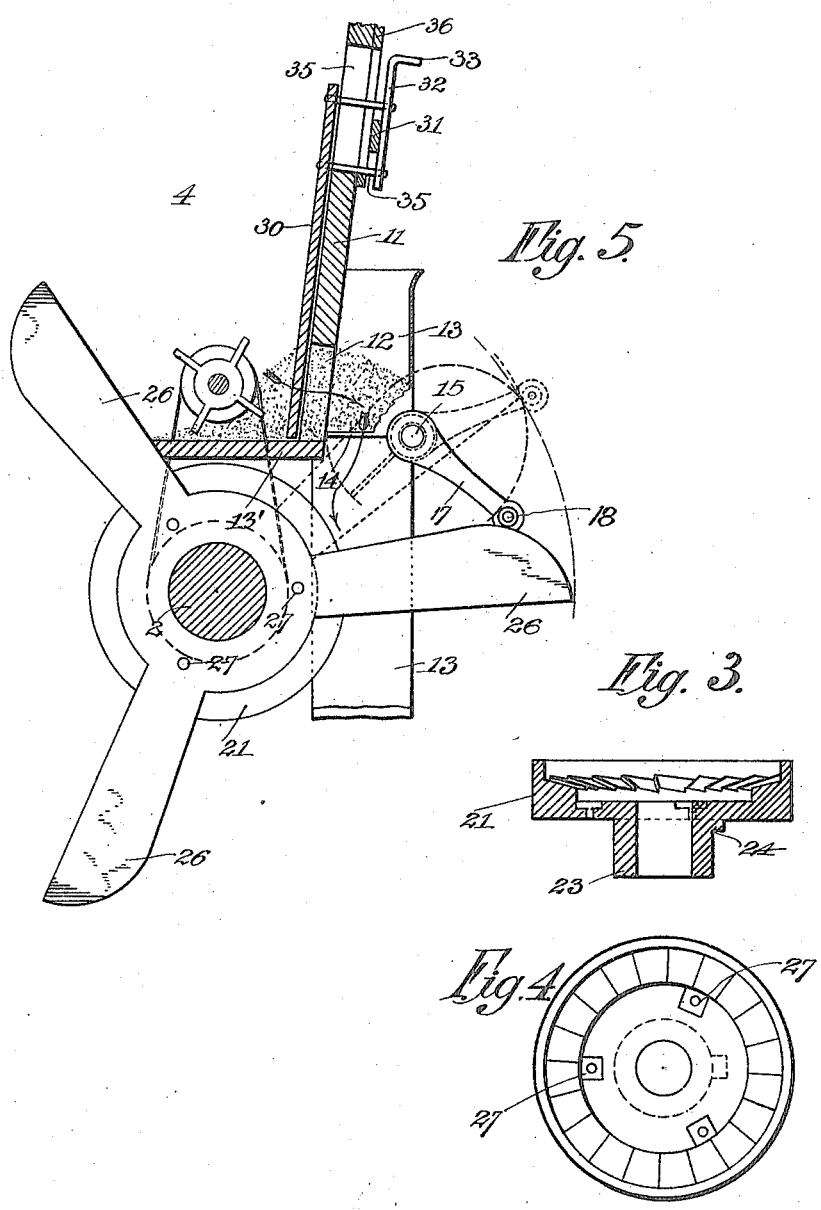

UNITED STATES PATENT OFFICE.

ANTONIO CARRILLO, OF GUAREIRAS, CUBA.

APPARATUS FOR DISTRIBUTING FERTILIZERS.

1,180,470.  Specification of Letters Patent.  Patented Apr. 25, 1916.

Application filed February 25, 1915. Serial No. 10,560.

*To all whom it may concern:*

Be it known that I, ANTONIO CARRILLO, landlord, a citizen of the Republic of Cuba, residing at Guareiras, Provincia de Matanzas, Cuba, have invented new and useful Improvements in Apparatus for Distributing Fertilizers, of which the following is a specification.

The invention relates to an apparatus for distributing fertilizers on plantations or groves.

It is an object of the invention to provide an apparatus of the character described in which a distributing device is actuated intermittently when the apparatus is conveyed.

Another object of the invention is to provide an apparatus which permits a precise predetermination of the amount of fertilizer to be distributed at certain distances.

Another object of the invention consists therein to enable the operator to predetermine the distances at which the discharge of the fertilizer should take place.

Another object of the invention consists in the provision of means for enabling the operator to effect the discharge of the fertilizer at any desired place, when the apparatus is stationary.

Other objects will become more apparent by reference to the drawings, the application and the claims forming part thereof.

Figure 1:
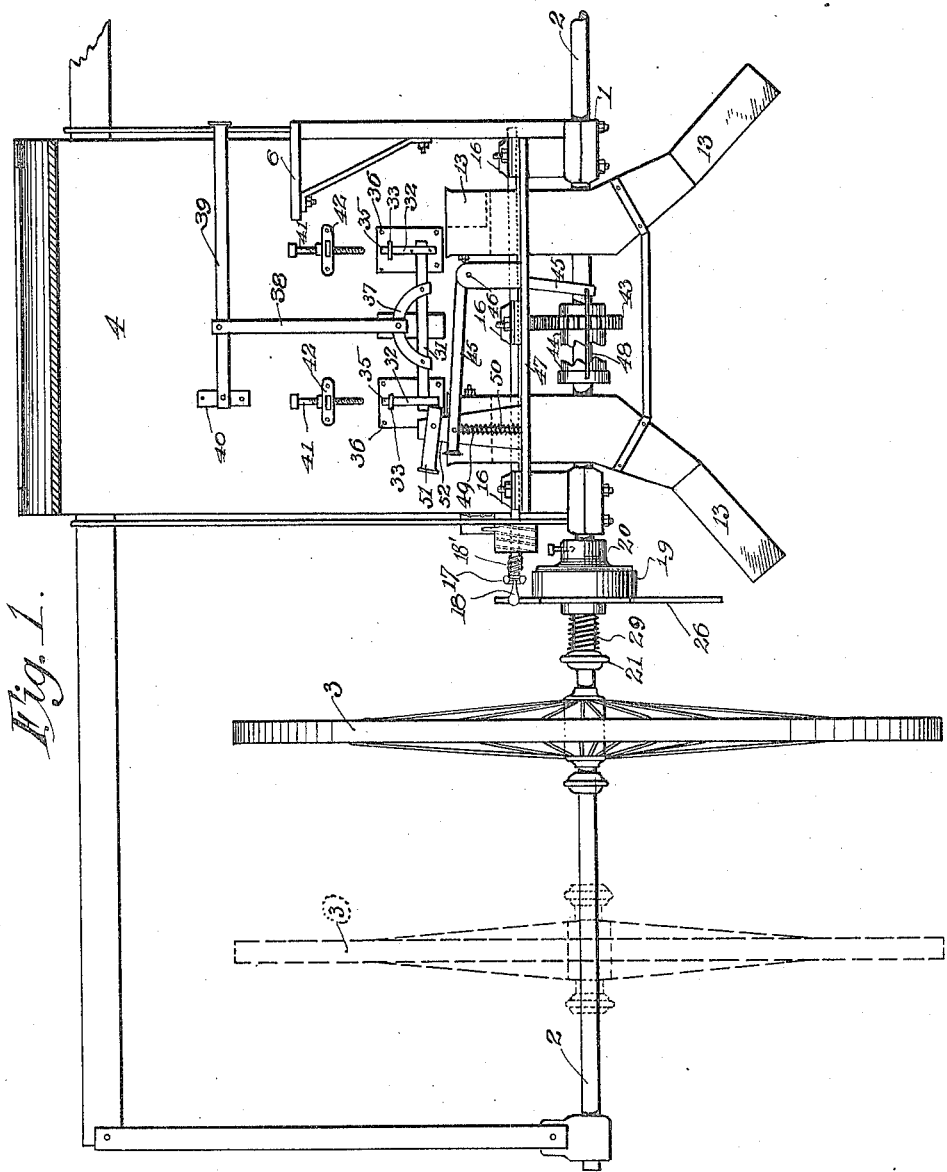
Figure 2:
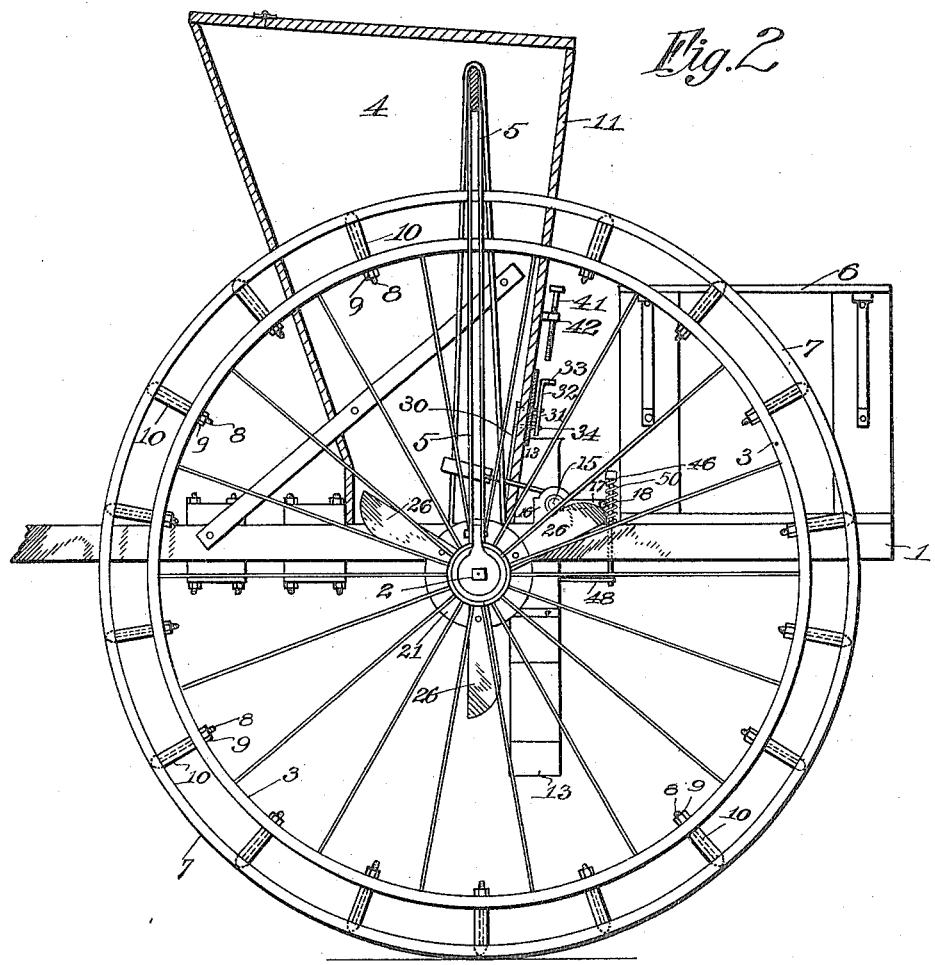

In the accompanying drawing Figure 1 is a rear view of the device made in accordance with the invention. Fig. 2 is a side view thereof. Figs. 3 and 4 are detail views of a clutch member and Fig. 5 is an enlarged view of the lower part of the hopper and a distributing mechanism provided thereon.

Referring to the drawings, 1 denotes a horizontal framing of a truck mounted in any approved manner on a shaft 2 carried by the drive wheel 3 of the truck. The shaft 2 projects a considerable distance beyond the wheels in order to permit a lateral shifting of the latter, such as may be necessary when the distance between furrows varies.

Mounted on the horizontal frame 1 are vertical frames 5 placed apart and adapted to support a hopper 4 wherein the fertilizer is stored. The upper end of the fertilizer hopper is closed up by a door movable about a horizontal axis, as illustrated in the drawings. On the rearward portion of the framing 1 and behind the hopper 4 a seat 6 is provided for the operator to place him within easy reach of the various mechanisms, as hereinafter specified.

The apparatus is driven in the usual manner by a team hitched to the front end of the truck, where suitable means are provided. The drive wheels 3 are of a large diameter and are so constructed as to permit an enlargement of their diameter for a purpose hereinafter specified. A tire 7 of larger diameter than the wheel proper and of rigid material may be attached to the latter by means of a plurality of spacing tubes 10 which hold the tire in fixed relation to the wheel. The tubes 10 are inserted between the rim of the wheel 3 and the concentrically disposed tire 7 with their longitudinal axes in radial arrangement and are held in place by means of bolts 8, the heads of which are countersunk in the tire to provide a smooth running surface, while threaded members 9 are provided on the inner ends of the bolts projecting radially into the wheel between the spokes. The diameter of the wheel may be changed in accordance with the distances of the places to be fertilized, it being understood that in sugar plantations for which this device is especially adapted, the sugar canes are planted in distances from each other determined by the condition of the soil and the available irrigation means.

The rear wall 11 of the hopper 4 is provided with two apertures 12 (Fig. 5) adjacent to its bottom edge through which the fertilizer is to be discharged in a manner presently to be described. Adjacent to the rear wall 11 and in contact therewith are a pair of spouts 13 of square or rectangular cross section with the lower ends placed apart at a distance equal to the distance between two furrows.

In the interior of the spouts 13 and in alinement with the bottom 13′ of the hopper 4 oscillatory shutters 14 are rigidly mounted on a transversal shaft 15 journaled in bearings 16 carried by the side members of the framing 1 of the truck. The horizontal shaft 15 is so disposed that its longitudinal axis coincides with the rear side of the spouts 13 whereby half of its circumference is hidden inside of the spouts. The shutters 14 completely close the spouts 13 when in the horizontal position, but permit the passage of fertilizer when placed under an angle to the horizontal. The shaft 15 is provided at one of its ends with a crank arm 17 which carries on its free end a bolt 18, perpendicular to the arm, and said shaft 15 is capable of being turned against the action of a coiled spring 18', which tends to maintain the shaft and the shutters 14 normally in a horizontal position.

On the shaft 2 of the truck a clutch member 19 is mounted comprising a disk having a toothed face and integral with the disk is a hub 20 provided with a radial opening for the reception of a set screw 21 to secure the clutch member 4 to the shaft 2. This clutch member 19 engages another member 21, (Figs. 3 and 4) loosely mounted on the shaft 2, of similar construction comprising also a disk with a toothed face adapted to engage the toothed face of the coöperating clutch member. The clutch member 21 is provided with an angular flange 22 adapted to surround the disk of clutch member 19 in order to prevent the entrance of earth, dirt, or other foreign substances between the members. Integral with the clutch member 21 is a hub 23 provided with a lug 24 which is adapted to enter a recess 25 of an actuating roller 26. The roller 26 is detachably secured to the clutch member 21 by means of a plurality of bolts inserted into the openings 27 provided in the roller 26 and in the clutch member 21. The roller is provided with a plurality of fingers.

It is obvious that when the clutch is coupled the actuating roller 26 successively engages bolt 18 of the crank arm 17 whereby the shutters 14 are forced out of their horizontal position and the fertilizer within the spouts 13 is discharged. According to the plantation to be fertilized, an actuating roller with a greater or smaller number of fingers may be used in order to vary the frequency of the discharge of the fertilizer. By changing the diameter of the wheels 3 and exchanging the roller 26 the distances at which a certain predetermined amount of fertilizer is discharged may be varied, such distances generally ranging between 42, 48, 64, 84 and 96 inches. Between the hub 23 of the clutch member 21 and a collar 28 provided at a distance therefrom and keyed to the shaft 2 a coiled spring 29 is interposed which tends to maintain the clutch member 19 and 21 in engagement.

In order to regulate the amount of fertilizer which is to be discharged by the hopper 4 at each oscillation of the shutters 14, a pair of sliding gates 30 are provided in the interior of the hopper 4 which control the apertures 12. The sliding gates 30 are actuated by a mechanism comprising a horizontal bar 31 which is connected at its ends to vertical bars 32. The vertical bars 32 are bent at their upper ends into horizontal flanges 33 and are connected with the sliding gates 30 by means of bolts 34 sliding in vertical slots 35 provided in the rear wall 11 of the hopper 4 and in back plates 36 mounted exteriorly on the wall 11 to serve as guides for the bolts 34. Intermediate its ends the horizontal bar 31 is connected at two points with a bar 37 of semicircular form to which a vertical bar 38 is secured. The vertical bar 38 is connected to a lever 39 intermediate its ends, the lever being pivotally mounted in a support 40 secured to the wall 11.

In alinement with the vertical bars 32 and at a distance therefrom a pair of vertical screws 41 are mounted in bearings 42 fastened on the outside of the wall 11 of the hopper 4. The lower ends of the screws 41 are adapted to abut the flange 33 of the bars 32 when the lever 39 is turned upwardly whereby the upward movement of the bars 31 and therewith of the gates 30 is limited.

From the foregoing it is obvious that upon adjustment of the screws 41 the gates uncover more or less the openings 12 of the rear wall 11 of the hopper 4 so that a desired and predetermined amount of fertilizer may reach the tube to be discharged in the manner hereinbefore specified.

In the interior of the hopper 4 an agitating device is provided, which by itself does not form part of the invention. This agitator is actuated by a gear 43 forming part of a clutch mechanism 44 mounted on the shaft 2 of the truck. The coöperating part of the clutch is connected by means of a rod 48 to the lower end of a bell crank lever 45 pivotally mounted in a bearing 46 carried by a transverse beam 47 of the frame 1 of the truck. The other end of the bell crank lever 45 is connected with an extension 49 around which a coiled spring 50 is wound which acts upon the transversal beam 47 and the bell crank lever 45. A revolving stop 51 is mounted in a support 52 also carried by the transversal beam.

The operation of the device is the following:

When it is desired to start at a certain point the truck is brought there with the chutes 13 pointing toward the places to be fertilized. The operator will first lift the lever 39 whereby the fertilizer stored in the hopper 4 will discharge into the chute 13 where it is kept in place by the shutters 14 which are in the horizontal position. The actuating roller 26 is then laterally shifted by hand or foot against the action of the spring 29 whereupon the crank arm 17 is manually oscillated to effect a discharge of a certain quantity of fertilizer. The actuating roller is then released to return to its normal position whereupon the truck is moved in a straight line following the furrows. The coupling 19, 20 being in engagement, the actuating roller 26 is rotated and as fingers of the roller engage bolt 18 of the crank arm 17, the shutters 14 are oscillated and a certain amount of fertilizer is permitted to be discharged intermittently. In order to fertilize the furrows extending at right angles to the traversed ones, the sliding gates 30 are closed and the truck is placed in such a manner that the lower ends of the discharge spouts 13 will point to the furrows now to be fertilized. To effect a discharge at the position of the truck now at rest the sliding gates are opened by an upward movement of the lever 39 and the actuating roller 26 is shifted axially against the action of spring 29. By turning the crank arm 17 in the previously described manner the discharge of fertilizer may be effected on the resting place of the truck whereupon the truck is moved and the discharge is effected automatically at intervals.

It is obvious that it is within the ability of the operator to change the distances at which the fertilizer is discharged by increasing or decreasing the diameter of the drive wheels and by providing an actuating roller 7 having a greater or smaller number of fingers. It is also possible to accurately determine the amount of fertilizer to be discharged at each oscillation of the shutters by adjusting the screws 41 whereby an opening 12 in the rear wall 11 is more or less uncovered by the sliding gates 30 controlling the same.

The described device is especially suited for the fertilizing of cane sugar plantations where the cane is planted as stated above at certain distances and at the corners of squares. It often becomes necessary to fertilize growing sugar cane. In order to do away with the tedious manner of fertilizing by hand the device may be used advantageously by moving the same to the place or places to be fertilized without disturbing the growing cane and the discharge of the fertilizer may be effected regardless of the actuating roller by disengaging the same and oscillating the shutter by hand, as described above.

I am aware that certain moderations and modifications of construction may be made without departing from the spirit and scope of the invention and I want to avail myself of all such departures, modifications and changes that necessarily fall within the scope of the invention as specifically pointed out in the appended claims.

I claim:

1. In a device of the character described, the combination of a hopper containing fertilizer and having discharge openings with spouts communicating with said openings, shutters rotatably mounted in said spouts and adapted to control the discharge thereof, means for oscillating said shutters at predetermined distance, sliding gates provided within said hopper adapted to control the discharge openings of said hopper, means for operating said sliding gates, and means for limiting the range of movement of said sliding gates.

2. In a device of the character described, the combination of a drive shaft with a hopper containing a fertilizer and having discharge openings, a plurality of spouts registering with said discharge openings, a rock shaft having its axis coincide with the rear walls of said spouts, means for oscillating said rock shaft at predetermined intervals of time, sliding gates provided in the interior of said hopper adapted to control the discharge openings thereof and normally closing the same and manually operating means for varying the range of movement of said sliding gates.

3. In a device of the character described, the combination of a drive shaft with a hopper containing fertilizer and having discharge openings, spouts registering with said discharge openings, a rock shaft having its axis coincide with the rear wall of said spouts, a crank arm connected at one end to said rock shaft, a bolt integral with said crank arm, an actuating roller slidably mounted on said crank shaft and adapted to oscillate said rock shaft at predetermined intervals of time, sliding gates mounted in the interior of said hopper adapted to control the discharge openings thereof and normally closing the same and adapted to be actuated by manually operated means, said means comprising a transverse member connected to said gates by means of bolts moving in slots of the rear wall of said hopper and means for varying the range of movement of said sliding gates.

In testimony whereof I affix my signature in presence of two witnesses.

ANTONIO CARRILLO.

Witnesses:
 RICARDO MORÉ,
 LYMAN A. CHRISTY.